Oct. 4, 1949.  T. F. WHITE  2,483,716
BELT
Filed May 11, 1946

INVENTOR.
THOMAS F. WHITE
BY *Martin E. Anderson*
ATTORNEY

Patented Oct. 4, 1949

2,483,716

UNITED STATES PATENT OFFICE 2,483,716

BELT

Thomas F. White, Denver, Colo., assignor to The Gates Rubber Company, Denver, Colo., a corporation of Colorado Application May 11, 1946, Serial No. 669,011

1 Claim. (Cl. 74—233)

This invention relates to improvements in belts and relates more particularly to belts of substantial thickness, such as belts of the so-called V-type or double V-type.

Side driving belts are used very extensively for transmitting power and such belts are mostly of the type known as V-belts, having a layer of tension elements embedded in the body and a covering of woven fabric, preferably bias cut. Such belts are very effective, due to the fact that such belts are usually employed in connection with drives having short distances between pulley centers and pulleys of rather small diameter, they are subjected to a great number of bends during each unit of time. Since such belts have considerable thickness, the outer surface will be elongated and the inner surface compressed when the belt passes around a pulley. This continued extension and compression of the belts along their outer surfaces puts a large amount of strain on the fabric covering which, due to repeated strains, fails by breakage.

Fabric covering also adds to the rigidity of the belts, whereas, the ideal conditions for belts of this type are the combination of great tensile strength and flexibility.

It is the object of this invention to produce belts of such construction that they will have great flexibility without sacrificing any of their other essential properties.

This invention, briefly described, consists in constructing belts of the V or double V-type without employing in their construction woven fabric, but employing in place thereof, a cord fabric which is applied in such a manner that the cords extend in diagonal or helical directions around the belts. The cord covering is of such construction that the cords are held together by a rubber or rubber-like substance and in which there are no cords or threads corresponding to the weft of an ordinary woven fabric except to the extent that, during the manufacture of such cord fabric, a few weak threads are employed to temporarily hold the cords in position while receiving the rubber coating.

Having thus set forth the objects of the invention and briefly described the invention itself, the latter will now be described in greater detail and for this purpose reference will be had to the accompanying drawing in which the belt has been illustrated in its preferred form, and in which.

Figure 1:
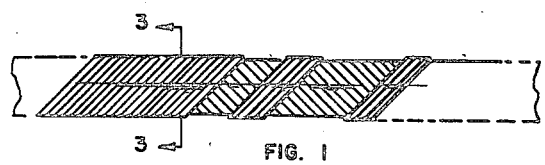
Figure 1 is a side elevation of a section of belting made in accordance with this invention, portion of the covering having been removed to better disclose the construction.
Figure 2:
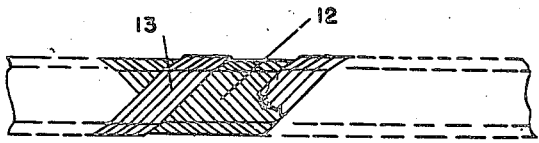
Figure 2 is a top plan view of the belt with portions of the outer covering removed to better disclose the construction.

In the drawing reference numeral 10 designates a layer of tension elements which may be ordinary prestretched cotton cords or stranded metal tension elements. The tension layer is embedded in a body 11 of rubber composition, formed from either natural or the so-called synthetic rubbers, or, it may be formed from any other equivalent material. The outer coating which has formerly been composed of one or more layers of rubberized bias cut woven fabric is, in this case, formed from cord fabric in which the parallel cords are held together by the adhesive action of a coat or coating of rubber or rubber-like material. In the drawing reference numeral 12 designates the inner layer of cord fabric which is applied in such a manner that the cords extend across the belt at an angle of substantially 45 degrees. Where a double layer of cord covering is employed an outer layer like that designated by 13 is applied over the inner layer, but in the opposite direction so that the cords cross at an angle of substantially 90 degrees. The covering is usually formed from narrow strips of rubberized cord fabric cut at any suitable angle. The strips have a width slightly greater than that necessary to enclose the belt so as to overlap at the edges in the manner shown in Figure 5. Where two layers are employed, the inner layer may be of such width that the edges abut as indicated at 14 in Figure 5.

After the belt has been assembled around the tension elements, it is placed in a vulcanizing mold and subjected to a heat treatment for curing. The cross section of the mold determines the cross sectional shape of the belt which, in the present embodiment as illustrated in a double V-belt.

After the belt has been cured, it is removed. Such belts are found to be very flexible, compared to the ordinary fabric covered belts.

Figure 4:
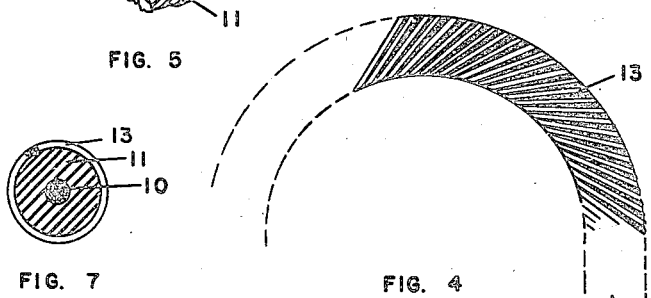
Figure 4 is a side view of the belt showing it curved through an angle of 180 degrees and illustrates the relative movements between adjacent cords of the covering.

Referring now more particularly to Figure 4, it will be seen that the cords forming the outer layer will separate slightly along the outer periphery of the belt when the belt passes around a pulley and that the cords will, at the same time, be subjected to a compressive force along the inner periphery of the belt. The spacing of the cords has, of course, been exaggerated in Figure 4. The amount each cord separates from its adjacent cord is comparatively small. Since the adhesive or rubber-like material by which the cords are attached to each other is elastic, the slight variation in spacing will be taken care of by the elasticity of the rubber compound.

Tests have shown that belts constructed in the manner described herein have longer life than the fabric covered belts and they also develop less heat during the operation for the reason that the compressive and tensile strains are less, due to the fact that the covering can be compressed and extended with the application of less force.

Figures 3, 5:
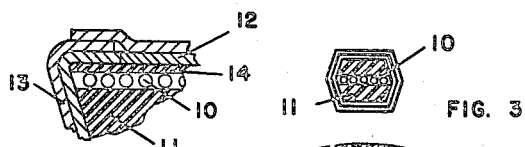
Figure 3 is a section taken on line 3—3, Figure 1.
Figure 5 is a view similar to Figures 3 and 6, but to a larger scale, and shows a detail of the construction.
Figure 6:
Figure 6 shows a cross section of an ordinary V-type belt having a continuous helical winding.
Figure 7:
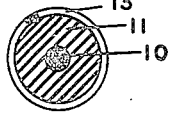
Figure 7 shows the invention embodied in a belt of circular cross section, having a helical winding.

Although the belt has been illustrated in Figures 1 to 4 as being of the double V-type, it is evident that it can be of the V-type as shown in Figure 6, or of the round cross section as shown in Figure 7.

The greatest benefit from the use of such covering is in connection with belts having a considerable thickness because of the stretch and the compression are then greater than in the flat belts. Where the belt has a thickness of $t$ the difference in length between the inside and the outside of the belt in making a curve of 180 degrees is $\pi t$ and if $t$ is one-half an inch, the difference in length will be slightly more than one and one-half inches. This difference in length occurs twice during each complete movement of the belts about the pulleys. It is evident that a short and fast moving belt is subjected to an immense number of flexures during operation and belts provided with the ordinary fabric covering break much sooner than belts constructed in the manner shown on the drawing and described herein.

In the drawing the angular inclination of the cords has been shown as 45°; it is to be understood that this is illustrative only and that any other angle may be used if found more desirable.

Instead of forming the outer layer from strips of cord fabric wrapped around the belt as shown in Figure 5, a layer of cord may be wrapped about the belt helically and this has been shown in Figures 6 and 7 where the outer layer is formed from a continuous cord wound helically.

Figure 8:
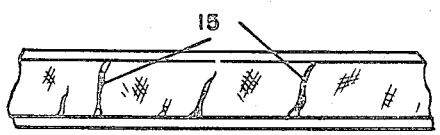
Figure 8 is a view showing the appearance of the inner surface of a similar belt covered with bias cut rubberized fabric, after a test run.

In Figure 8 the appearance of the inner surface of a similar belt has been shown. The appearance is that of a test run of ninety-four hours and shows the fabric cracked transversely and torn as indicated at 15.

Having described the invention what is claimed as new is:

In an endless V-belt of the type having a core of substantially inextensible tension elements enclosed in a body of rubber composition, the combination therewith of at least one covering layer formed from a single cord wrapped helically around the belt, successive convolutions of the cord being juxtaposed in substantially abutting relationship, and an elastic agglutinant interconnecting the convolutions adapted to permit separation of adjacent portions thereof at the outer periphery of the belt when the outer surface thereof is elongated during the passage of the belt around a pulley.

THOMAS F. WHITE.

REFERENCES CITED

The following references are of record in the file of this patent:

UNITED STATES PATENTS

| Number | Name | Date |
| --- | --- | --- |
| Re. 20,479 | Freedlander | Aug. 24, 1937 |
| 1,970,509 | De Wein et al. | Apr. 14, 1934 |
| 2,029,381 | Merrill et al. | Feb. 4, 1936 |
| 2,073,668 | Wilson | Mar. 16, 1937 |
| 2,260,719 | Merrifield | Oct. 28, 1941 |